Oct. 12, 1943.  J. K. CONNER ET AL  2,331,656
METHOD OF CONTROLLING THE COMPOSITION OF BUTTER
Filed June 13, 1941  4 Sheets-Sheet 1

INVENTORS
JAMES K. CONNER
EMERSON W. BIRD
CHARLES B. FLAKKER
OSCAR J. JOHNSON

By Paul, Paul & Moore
ATTORNEYS

Oct. 12, 1943.  J. K. CONNER ET AL  2,331,656
METHOD OF CONTROLLING THE COMPOSITION OF BUTTER
Filed June 13, 1941  4 Sheets-Sheet 2
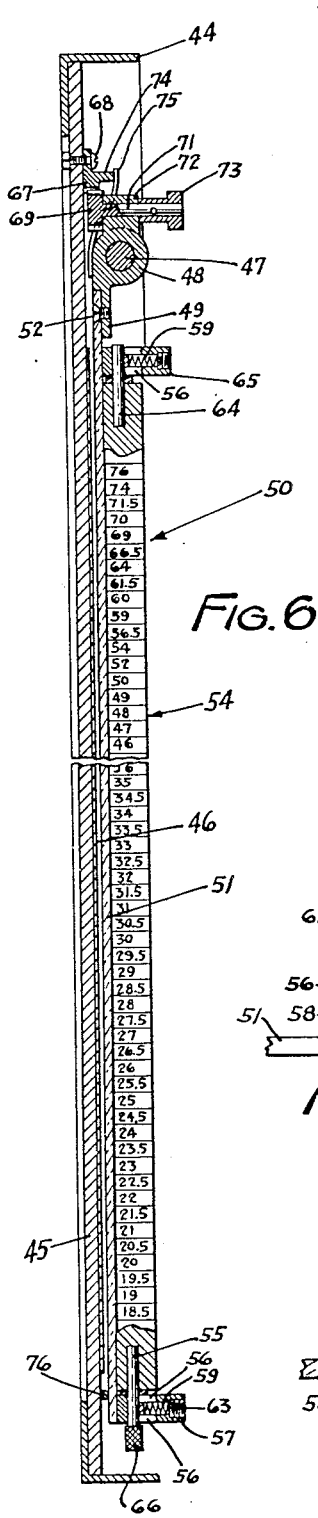
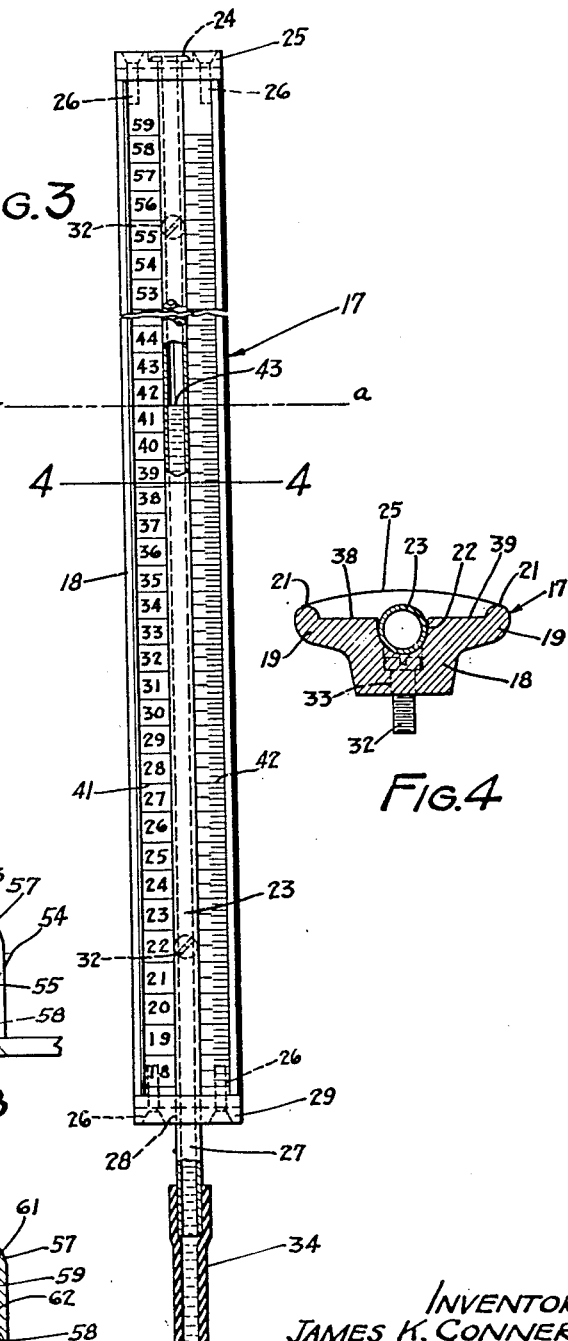
INVENTORS
JAMES K. CONNER
EMERSON W. BIRD
CHARLES B. FLAKKER
OSCAR J. JOHNSON
By Paul, Paul + Moore
ATTORNEYS

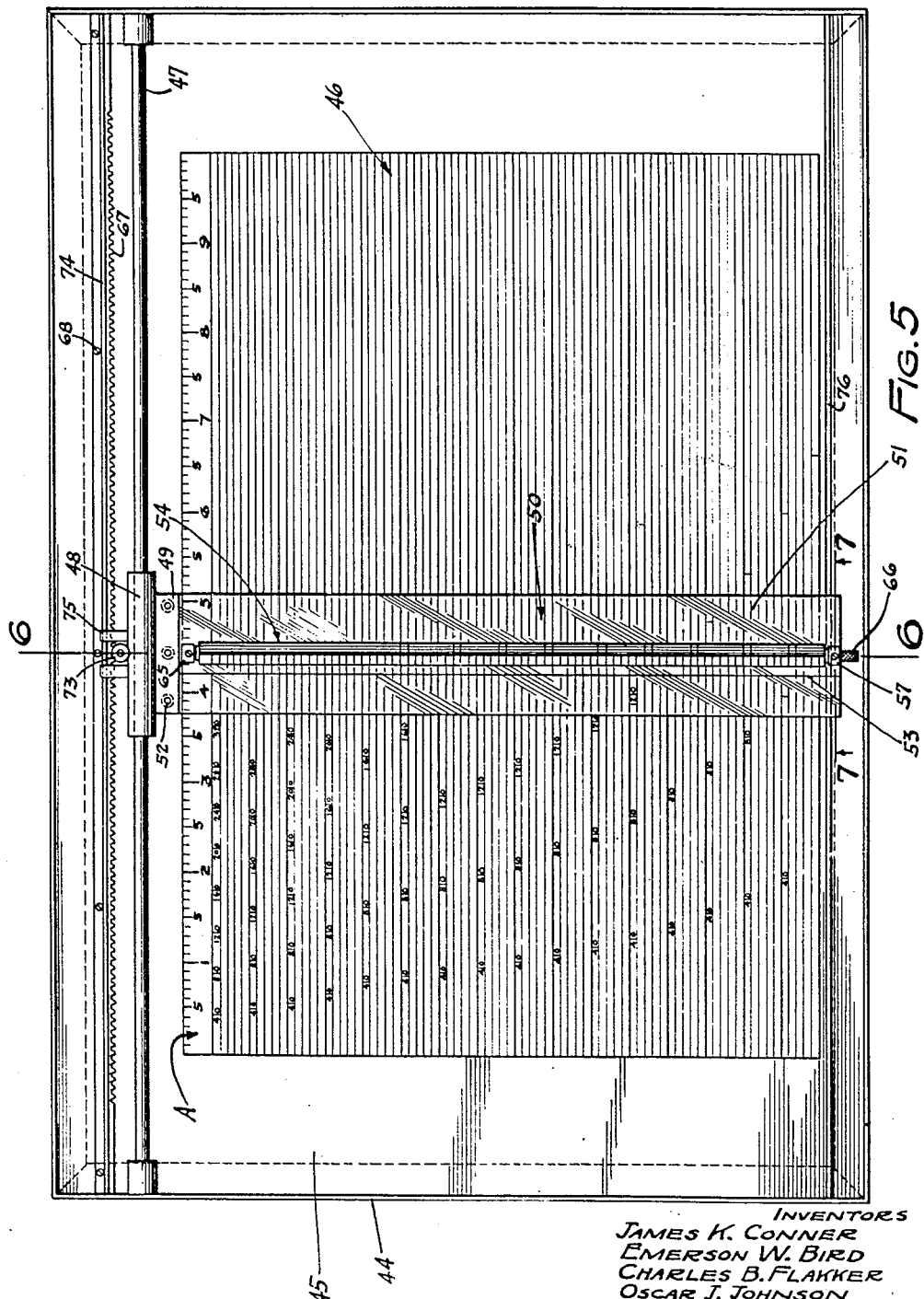

Oct. 12, 1943.   J. K. CONNER ET AL   2,331,656
METHOD OF CONTROLLING THE COMPOSITION OF BUTTER
Filed June 13, 1941   4 Sheets-Sheet 4
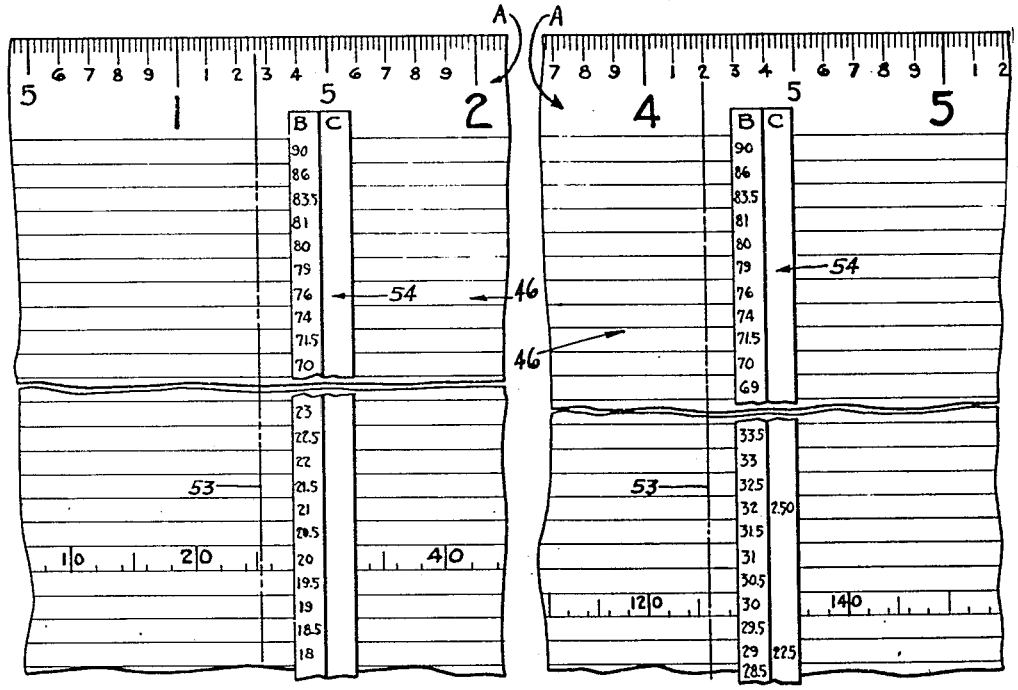
FIG.10   FIG.9
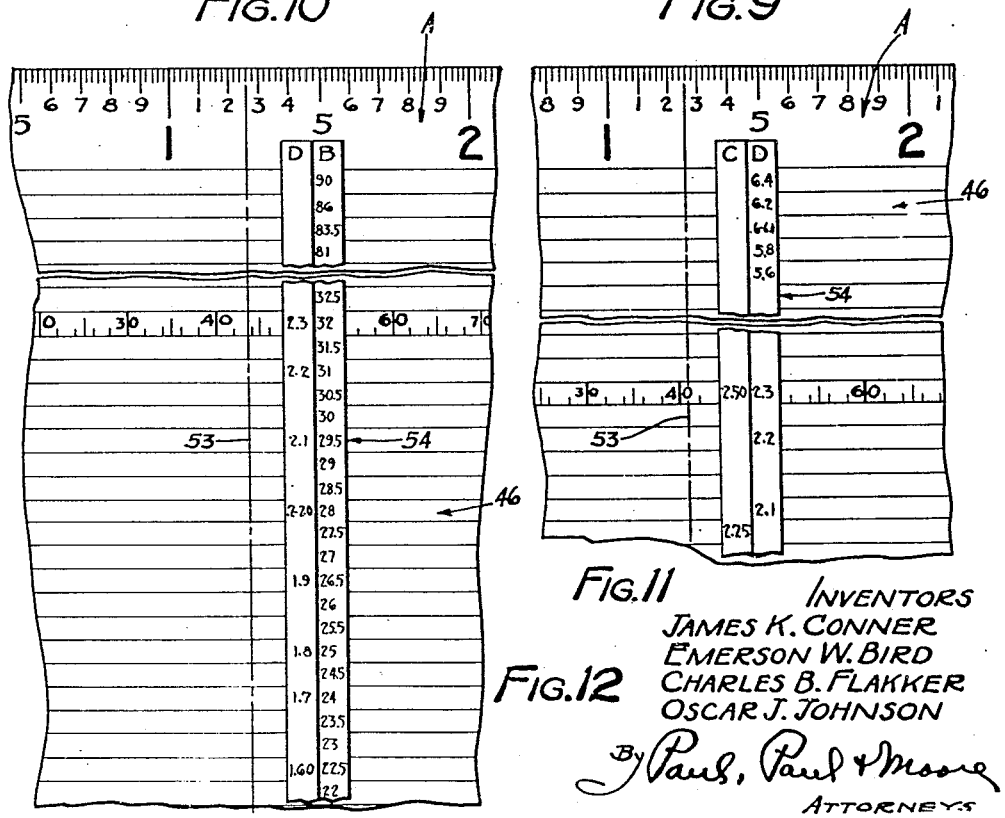
FIG.11   
FIG.12
INVENTORS
JAMES K. CONNER
EMERSON W. BIRD
CHARLES B. FLAKKER
OSCAR J. JOHNSON
By Pauls, Paul & Moore
ATTORNEYS Patented Oct. 12, 1943

2,331,656

UNITED STATES PATENT OFFICE 2,331,656

METHOD OF CONTROLLING THE COMPOSITION OF BUTTER

James K. Conner, Minneapolis, Minn., Emerson W. Bird, Ames, Iowa, and Charles B. Flakker and Oscar J. Johnson, Mandan, N. Dak., assignors to Mandan Creamery & Produce Company, Mandan, N. Dak., a corporation of North Dakota Application June 13, 1941, Serial No. 397,950

4 Claims. (Cl. 31—89)

This invention pertains to the manufacture of butter and relates more particularly to an improved method for controlling the composition thereof.

In the manufacture of butter as now commonly carried on in most creameries throughout the country, the problem of controlling the composition of butter has been more or less a constant source of worry for the buttermaker or manufacturer, primarily, because of the lack of proper equipment for controlling butter composition. Butter manufactured for sale to the trade must meet the standards established by the Pure Food and Drugs Administration which, at present, requires that commercial butter contain at least 80 percent butterfat. If the butter sold by a manufacturer does not contain the required percentage of butterfat, the manufacturer may be subjected to severe penalties. The butter, in addition to containing the required percentage of butterfat, should also be of proper color, and should contain the correct amounts of salt and moisture in order to provide a butter of uniform composition and quality having high market value.

To avoid making butter with an insufficient percentage of butterfat, many buttermakers purposely increase the butterfat percentage of their butter to such an extent that they may be reasonably sure that the butter will contain at least the required percentage of butterfat or slightly more, in order to avoid being penalized or subjected to heavy fines. Excess butterfat obviously increases the manufacturing cost of butter, as the cost of butter is based on the minimum percent butterfat requirement, as established by the Pure Food and Drugs Administration. If the butter contains a relatively higher percentage of butterfat than is actually required by law as, for example 83%, the cost of the added 3% butterfat is, of course, lost to the manufacturer which, in turn, reverts back as loss to the milk or cream producer. There are numerous creameries throughout the country which have a butter output of several hundred thousand pounds annually which, because of the lack of knowledge and proper equipment for expeditiously and efficiently controlling the composition of butter, during the churning operation of the cream, follow the common practice of slightly increasing the percentage of butterfat in their butter, as hereinbefore stated, with a resultant decrease in the percentages of the other constituents of the butter, such as salt, curd and moisture. These latter constituents, collectively, constitute what is commonly known to the trade as the "overrun," the cost of which, in dollars and cents, is substantially negative, so far as the manufacturer is concerned.

In other words, the manufacture of butter, in the past, has been done in a more or less haphazard manner because of the inability of buttermakers to control the composition of the butter during the churning operation. Such lack of composition control has resulted, to a large extent, because of the lack of equipment for accurately determining the weight of the cream introduced in the churn for each churning, which factor, in addition to the percent butterfat in the churn, must be known, in order to accurately determine the amounts of salt, moisture, and coloring (if necessary) to be added to the butter of each churning to produce a product of uniform composition, from churning to churning.

Heretofore, buttermakers have attempted to determine the weight of the cream in each churn by volumetric measures, which has been accomplished as, for example, by measuring the cream in a measuring vat, prior to introducing it into the churn or by estimating the weight of the cream by marks provided within the churn. Such methods of determining the weight of a body of cream in a churn are extremely inaccurate because of the viscosity of the cream and the air contained therein, as a result of agitation, whereby the weight of a given volume of cream may vary considerably.

To produce a butter of high market value, it is highly essential that the butter be of uniform composition and quality which, as hereinbefore stated, requires accurate control of the usual constituents of the butter, such as butterfat, salt, color, and moisture. All butter sold to the trade must contain at least 80% butterfat, but the amounts of salt and coloring matter may vary in different localities. In large creameries operating several churns, it is extremely difficult under the present method of making butter, to accurately control the amounts of the various constituents of the butter in each churning, whereby the butter from successive churnings may vary considerably in composition and quality, and also whereby the butter from different churns in a given creamery may vary in composition. This may result because of variations in the cream received from different sections of the country, which may vary to a large extent in butterfat and color.

It is therefore highly desirable that means be provided whereby the composition of the butter may be accurately controlled in an expeditious and efficient manner, and whereby the output of a plurality of churns in a given creamery will be of uniform composition, regardless of the inherent characteristics of the cream, prior to the churning operations.

An important object of the present invention, therefore is to provide an improved method for accurately controlling the composition of butter, whereby all of the butter made from a plurality of churns operating independently of one another in a given creamery, will result in a uniform product having greater consumer appeal and market value.

A further object of the invention resides in the provision of a novel method for determining the weight of a body of cream in a given churn by the use of a simple device having means for operatively connecting it to the churn, and whereby the weight of the churning may be quickly determined without removing the usual cover from the churn.

A further object is to provide an improved method of making butter, which includes the step of withdrawing a portion of the buttermilk from the churn immediately after the "break" occurs, or just prior to draining the buttermilk from the churn, and determining the weight of the churning from said portion of buttermilk.

Other objects of the invention reside in the provision of an improved method of controlling the composition of butter, whereby all guess work now common in the manufacture of butter, is completely eliminated, and whereby the resultant butter will be of uniform composition and quality, regardless of variations in the characteristics of the cream received from day to day.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 3 is an enlarged front view of the gauge for indicating the weight of the churning in the churn;

Figure 4 is an enlarged sectional plan view on the line 4—4 of Figure 3;

Figure 5 is a front view of the calculator, showing the general construction thereof;

Figure 6 is a vertical sectional view on the line 6—6 of Figure 5;

Figure 7 is an enlarged detail sectional view on the line 7—7 of Figure 5;

Figure 8 is a view showing a portion of the lower end of the slide;

Figure 9 is an enlarged detail view showing a portion of the chart of the calculator with the vernier scale positioned to indicate the number of pounds of butterfat contained in a given body of cream;

Figure 10 is a view showing the vernier positioned to indicate the amount of coloring agent required for a given churning to increase the color of the butter to the desired intensity;

Figure 11 is a similar view showing the vernier scale positioned to indicate the amount of salt to be added to a given churning; and Figure 12 is a view showing the vernier positioned to indicate the amount of moisture to be added.

Figure 1:
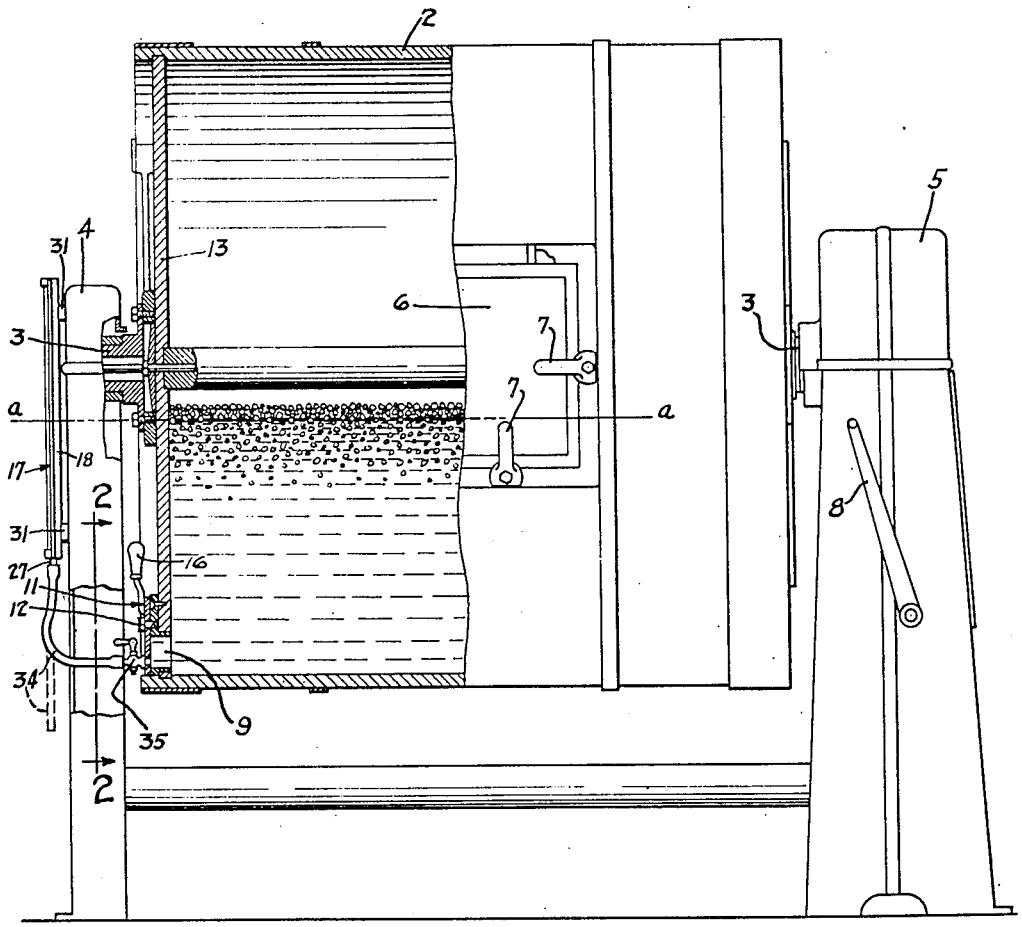
Figure 1 is a side elevational view of a churn, partially broken away, to more clearly illustrate the application of the invention thereto.

In the selected embodiment of the invention here shown, there is illustrated in Figure 1, for purposes of disclosure, a cylinder type churn of conventional design, comprising a cylinder 2 shown provided with trunnions 3, journaled in suitable bearings provided in pedestals 4 and 5. The cylinder or churn 2 is shown provided with the usual cover 6, removably secured to its seat by suitable locking elements 7, as will be understood by reference to Figure 1.

Figure 2:
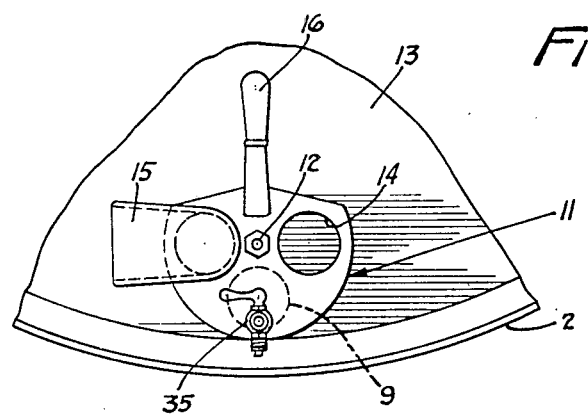
Figure 2 is an enlarged detail sectional view on the line 2—2 of Figure 1, showing the buttermilk gate of the churn.

The churn is driven or rotated by a suitable driving mechanism, not shown, which may be located within the pedestal 5, and is controlled by a suitable operating lever 8. The churn 2 is provided with the usual buttermilk drain opening 9, normally closed by a gate 11 pivoted at 12 to the end wall 13 of the churn. The gate 11 has an opening 14 which may be moved into registration with the drain opening 9 in the churn to permit the insertion of a suitable strainer or other device into the opening 9, as is customary in apparatus of this general type. The gate 11 may also be provided with a spout 15 which may be moved into communication with the drain opening 9 by rotation of the gate, as will readily be understood by reference to Figure 2. The gate is provided with a suitable operating handle 16.

An important feature of the present invention resides in the provision of means whereby the weight of a body of cream contained in a given churn, or the "churning," as it is commonly called in the trade, may be accurately determined in the churn without previously measuring or weighing the cream, as has heretofore been common practice.

The means provided for thus quickly and accurately determining the weight of the churning, is shown comprising a gauge, generally designated by the numeral 17. This gauge, as best shown in Figures 3 and 4, comprises an elongated body 18, shown provided with oppositely disposed flange portions 19, each preferably provided with a finishing bead 21, as best shown in Figure 4. A longitudinally extending groove 22 is formed in the body 18 of the gauge adapted to receive a transparent tube 23, shown provided with a head 24 at its upper end adapted to be engaged with a top piece 25, preferably secured to the upper end of the gauge body 18 by suitable screws 26. If desired, the head piece 25 may be integrally formed with the body 18.

The tube 23 extends the full length of the body 18 and has its lower end portion 27 projecting below the lower end of the gauge body. The end portion 27 of the tube 23 is received in an aperture 28 provided in a bottom piece 29 of the body 18, which bottom piece may be secured to the lower end of the body 18 in a manner similar to the top piece 25.

The gauge 17 may, for convenience, be mounted on one of the pedestals of the churn, as for example, pedestal 4, by suitable means, such as spacers 31 and screws 32, received in apertures 33 provided in the body 18 of the gauge, as best shown in Figure 4.

The lower end of the tube 23 is shown having one end of a flexible tube 34 connected thereto, the opposite end of which is adapted to be attached to the discharge nozzle of a small pet cock 35, shown mounted in the gate 11. When the tube 34 is attached to the pet cock, as shown in Figure 1, and the pet cock is opened, communication is established between the interior of the churn and the gauge glass or tube 23, whereby the buttermilk in the churn may rise in the glass of the gauge to the level of the buttermilk in the churn.

Another important feature of the invention resides in the novel manner in which the gauge 17 is graduated, whereby the level of the buttermilk in the gauge will indicate the weight of the churning contained in the churn. As best shown in Figure 3, the front faces 38 and 39 of the gauge 17 are provided with graduation marks 41 and 42, respectively, the marks 41 indicating pounds in steps of 100 and the marks 42 indicating pounds in steps of 10. The graduation marks of the scale are made in accordance with the volumetric capacity of the churn, and are designed to indicate the weight of the churning by reading the figures on the gauge which are coincident with the level 43 of the buttermilk or liquid in the gauge, as shown in Figure 3.

To determine the weight in pounds of a churning in a given churn after the cream has been placed in the churn, the churn is rotated sufficiently to cause the butter fat globules to coalesce to the desired granular size, as indicated in Figure 1, or to the point where the emulsion is broken and the "break" occurs. Just prior to draining the buttermilk from the churn, the free end of the rubber tube or hose 34 is connected to the pet cock 35, as shown in Figure 1, and the pet cock is then opened, whereupon buttermilk will enter and rise in the tube to substantially the level indicated by the line a—a in Figures 1 and 3 which, it will be noted, is coincident with the level of the buttermilk in the churn. It is to be understood that when the butterfat globules have coalesced, as shown in Figure 1, all of the air which may have been present in the cream before being introduced into the churn and during the initial churning thereof, has been dissipated therefrom, leaving a liquid free from bubbles in the lower portion of the churn, as will readily be understood. Thus, after the "break," if the hose 34 is connected to the pet cock 35 and the latter is opened, and the level of the buttermilk in the churn indicates 42 on the scale 41 of the gauge 17, as shown in Figure 3, the churning will weigh 4200 pounds. It will thus be noted that the operation of determining the weight of the churning becomes a very simple one which may be quickly and accurately accomplished by simply glancing at the scale 17, after connecting it to the churn by the tube 34, as shown in Figure 1.

This is a very important step of the invention, as it is necessary to know the weight of the churning and also the percent butterfat of the cream, in order to compute the pounds of butterfat in the churning and thereby accurately determine the required amounts of other constituents such as salt, coloring and moisture, which are added to each churning to standardize the composition of the butter. In other words, two factors must be known in order to accurately determine the required percentages of the constituents of the overrun, namely, the weight of the churning, and the percent butterfat of the churning.

The apparatus herein disclosed, which will hereinafter be referred to as a calculator, is best shown in Figures 5 and 6, and comprises a suitable frame 44 which may be constructed of angle iron or any other suitable material applicable for the purpose. A suitable backing plate 45 is mounted in the frame 44, to which a chart, generally designated by the numeral 46, is suitably secured.

The chart 46 is provided along its upper marginal portion with a horizontal scale, generally designated by the letter A, as shown in Figure 5. This scale is preferably graduated, the numerals in bold type representing thousands or hundreds, and the intermediate numerals, hundreds or tens, whichever the need may be. The body of the chart is horizontally ruled and provided with rows of figures which, in the present instance, indicate pounds.

A horizontal rod 47 is mounted in the upper portion of the frame 44 in spaced relation to the back wall 45 of the calculator, as best shown in Figure 6. A tubular member 48 is mounted for sliding movement on the rod 47 and is shown provided with a depending flange 49, to which a plate 51 is secured by such means as screws 52. For convenience, the plate 51 is preferably made of a suitable non-breakable, transparent material, such as "Plexiglas," whereby the figures on the chart 46 may be seen therethrough. A suitable vertically disposed hair line 53 is provided on the plate 51 adapted to be moved into registration with the numerals and graduations on the chart, as will subsequently be described. The tubular member 48 and transparent plate 51 will hereinafter be referred to as the "slide," generally indicated by the numeral 50.

A vernier scale, generally designated by the numeral 54, is mounted on the slide 50, and in the present instance, is shown triangular in cross section and adapted for rotary movement. The lower end of the vernier scale 54 has a pivot pin 55 rotatably supported in a slot 56 provided in a lug 57 secured to the plate 51 by suitable screws 58, as shown in Figures 7 and 8. If desired, other means may be provided for securing the lug 57 to the plate 51. A small spring 59 is shown received in an aperture 61 in the lug 57 and has one end engaging a block 62 having a concaved face engaging the pivot pin 55, as best shown in Figure 7. A plug 63 is received in threaded engagement with the outer end of the lug 57 and provides an abutment for the opposite end of the spring 59.

The upper end of the vernier scale 54 has a similar pivot pin 64 rotatably supported in a lug 65, similar to the lug 57 at the lower end of the scale. A spring 59 is also provided in the lug 65 for holding the vernier scale in position against the plate 51. The slots 56 in the lugs 57 and 65 permit the pivot pins 55 and 64 to move lengthwise in said slots, when the vernier scale 54 is rotated by manipulation of the knurled knob 66, to selectively position the scales on the vernier with respect to the hair line 53 of the slide. The vernier scale comprises three scales, indicated by the letters B, C, D; scale B indicating butterfat percentages, and being used in connection with the chart for determining the pounds of butterfat contained in a given churning, and also the ml. or ounces of coloring agent which may be required for each churning to standardize the color of the butter. Scale C indicates the salt percentages, and is used for determining the amount of salt required; and scale D is used for determining the amount of moisture to be added.

The tubular member 48 to which the plate 51 is secured, is slidable on the rod 47, as hereinbefore stated, to shift the position of the hair line on the scale A of the chart 46. To facilitate horizontally moving the slide 50, a rack bar 67 is shown secured to the back wall 45 of the frame 44 by suitable screws 68. The rack 67 is disposed above the rod 47 in spaced parallel relation thereto. A pinion 69 meshes with the rack bar 67 and is secured to one end of a short shaft 71 mounted in a bearing 72 provided on the tubular member 48 of the slide. The shaft 71 has a finger knob 73 secured thereto and projecting outwardly from the tubular member 48, whereby it may be conveniently grasped by the operator to adjust the position of the slide on the rod 47 to move the hair line 53 into registration with a selected figure on the chart.

The rack bar is shown provided with an outwardly projecting horizontal flange 74, the outer edge of which is adapted to be engaged by a spring element 75 having one end secured to the tubular member 48 in such a manner that the spring element 75 constantly tends to hold the lower end of the plate 51 in engagement with a guide rod or wire 76, as shown in Figure 6, suitably secured to the back wall 45.

*Operation*

The novel method of controlling butter composition, as herein disclosed, is performed in the following manner:

A quantity of cream is introduced into the churn 2; any quantity within the working capacity of the churn. The churn is then rotated to agitate the cream sufficiently to produce a homogeneous mixture, after which the operation of the churn is temporarily interrupted and a sample of cream withdrawn from the churn through the pet cock 35. The sample of cream thus withdrawn from the churn will be representative of the entire body of cream in the churn because of the cream previously having been agitated to produce a homogeneous mixture. From this sample, the butterfat percentage of the cream is determined by the usual Babcock butterfat test. The operation of the churn is immediately resumed, when said sample has been withdrawn from the churn, whereby the churning operation continues while the butterfat test is being completed. For the sake of explanation, let it be assumed that the butterfat test shows 30% butterfat.

The next step in the churning process is to determine the weight of the churning or body of cream in the churn, which is essential in order to subsequently determine the required amounts of the various constituents of the overrun, such as salt, coloring, and moisture, which must be added to the butter in the churn to produce a product of uniform composition and quality. To determine the weight of the churning, the churn is operated until the "break" occurs, or until the butterfat globules coalesce to the desired granular size, as hereinbefore stated. The operation of the churn is then temporarily interrupted, and the rubber tube 34 is connected to the pet cock 35. The pet cock is then opened to permit a portion of the buttermilk to rise in the glass tube of the gauge 17, to a level coincident with the level of the buttermilk in the churn 2, as indicated by the line a—a in Figures 1 and 3. The reading on the gauge 17 will indicate the weight in pounds of the churning in the churn which, in the present instance, may show 4200 pounds.

This method of determining the weight of the churning has been found extremely accurate and is not dependent upon any known quantity of cream being placed in the churn. In other words, the weight of the churning may be quickly determined in the manner above described, regardless of the quantity of cream delivered into the churn, or the percent butterfat of the cream, it being necessary, however, that the butterfat test sample be removed from the churn before the churn has revolved sufficiently to change the physical and chemical characteristics of the cream, other than to cause homogeneity. When the weight of the churning has been determined as above, the buttermilk may be drained from the churn.

The third step resides in determining the weight in pounds of butterfat contained in the churning. This is accomplished in the following manner:

Move the hair line 53 of the slide 50 into registration with 4200 on scale A of the chart, which figure represents the weight of the churning as determined by the second step of our improved method. See Figure 9. Scale B of vernier 54 is then positioned in operative relation to hair line 53, and the operator then reads down to 30% on scale B of the vernier, and notes the figure indicated on the chart by hair line 53 which, in the present instance, is shown as 1260, which represents the pounds of butterfat in the churning. Suitable horizontally disposed graduation marks or lines are preferably provided between the numerals on scale B of the vernier, which are spaced apart to correspond to the spacing of the horizontal lines on chart 46 to facilitate taking the various readings on the chart.

After the weight of the butterfat in the churning has been determined, and the buttermilk has been drained from the churn, the composition of the butter is standardized by adding to the butter in the churn, the required amounts of salt, coloring agent, and moisture to bring the composition of the butter up to market standards. The market demands that butter be uniform in color, and this phase of the churning operation must therefore be carefully observed so that a suitable coloring agent may be added to the butter in the churn, in the event the natural color thereof is too pale. The shade of yellow in butter varies with market requirements, some parts of the country demanding a lighter shade of yellow, while others may demand a deeper shade of yellow.

It is therefore highly desirable that means be provided whereby the color of the butter may be conveniently and accurately controlled to meet market demands, regardless of the natural color of the butter which, at certain times of the year, may be sufficiently intense to meet market demands. In such cases, no coloring agent is added to the butter.

In accordance with the present method, if the color of the butter of a particular churning is found to be too pale, and a color test indicates that said butter requires for example, 20 ml. of coloring agent per 100 pounds of butterfat to bring the color of the butter up to market standards, the operator moves the slide 50 of the calculator to the left, from the position shown in Figure 9, until the hair line 53 registers with 1260 on the top scale A of the chart, as shown in Figure 10; 1260 representing the pounds of butterfat contained in the churning, as determined by step 3. The butterfat scale B on the vernier is also used to determine the ml. of color required, and it is therefore unnecessary to shift the position of the vernier on the slide, when moving the slide from 4200 to 1260 on scale A of the chart.

When the hair line 53 has been moved into registration with 1260 pounds on scale A, as above stated, the operator reads down to 20 on scale B of the vernier and notes the reading at the hair line on chart 46 which, it will be noted, is 252, which represents the total ml. of coloring agent which must be added to the butter of a given churning to bring the color intensity thereof up to the desired shade of yellow.

The amount of salt required in the butter of a given churning may next be determined, and is accomplished by the use of scale C on the vernier 54, without moving the slide 50 relatively to the chart 46. The vernier 54 is simply rotated, by manipulation of the finger knob 66, until the salt percentage scale C thereof is in operative relation to the hair line 53, as shown in Figure 11. If the finished butter is to contain 2.50% salt, which is a factor determined by market demands, the operator reads down to 2.50 on scale C on the vernier and notes the reading indicated at the hair line on chart 46 which, in this instance, will show 40.2, as shown in Figure 11, which figure represents the total pounds of salt required in the butter to bring the salt content thereof up to the desired standard of 2.50%. The percentage of salt in butter varies with different markets, and it is therefore necessary that the percentage of salt required in butter for various markets be known, in order to provide butter with the desired percentages of salt for each market. Some markets demand an unsalted butter, in which case, the salt may be entirely omitted, and also the coloring agent, as unsalted butter is usually uncolored.

After determining the required amounts of coloring agent and salt to be added to the butter, the coloring agent is preferably introduced into the salt, and these two constituents poured into the butter in the churn. The churn is then rotated to uniformly incorporate the salt and coloring agent in the butter, and also to complete incorporation in the butter of any moisture remaining in the churn, after the butter has been rinsed or washed. When the moisture in the churn has been completely incorporated with the butter, a sample of butter is taken from the churn from which the percentage of moisture contained in the butter in the churn is determined in the usual manner which, in the present instance, may show 13.90%, commonly referred to as the initial moisture content of the butter.

To determine the total number of pounds of moisture which may be added to the butter to bring it up to market standards, the other constituents of the overrun, such as the percentages of salt and curd must be known which, in the present instance, are 2.50% salt and 1.00% curd (estimated). To avoid all danger of the butterfat percentage of the finished butter dropping below the 80% butterfat required by law, the present method is based on the use of 80.30% butterfat, the .30% being used as a safety factor as it is not uncommon to find a .2% deviation in the analysis of a given sample of butter by different chemists. With 80.30% butterfat in the finished butter, the overrun, comprising the percentages of salt, moisture and curd will total 19.70%.

In the present instance, the percentage of salt and curd total 3.50% of the overrun, which indicates that the desired moisture content of the finished butter will be 16.20%. Deducting the initial moisture test of 13.90% from the desired moisture content of 16.20%, leaves a difference of 2.3%, which represents a factor to be used in connection with the calculator to determine the necessary amount of moisture to be added to the butter to standardize the moisture content thereof to the desired 16.20%. This factor obviously will vary in accordance with variations in the initial moisture test.

When the factor 2.3% has been determined, the operator positions scale D of the vernier in operative relation to the hair line 53, as shown in Fig. 12, and reads down to 2.3 on the vernier and takes the reading at the hair line on the chart which, it will be noted in the present instance, shows a total of 43.7 pounds of moisture which may be added to the butter in the churn to raise the moisture content thereof to the desired 16.20%. The churn is then rotated to thoroughly incorporate the moisture and other constituents of the overrun to complete the operation of making the butter.

From the foregoing, it will be noted that by the use of the novel method and apparatus herein disclosed, the composition of butter may be accurately controlled, whereby the butter will be of uniform composition and quality, regardless of the inherent characteristics of the cream delivered to the creamery from day to day. It will also be noted that the percentages of the various constituents of the overrun are accurately calculated, whereby all guess work heretofore common in the art of butter making, has been completely eliminated, with the result that the consumer is assured of a product of uniform composition and quality, and in like manner, the manufacturer is assured that his product will always contain the percent butterfat required by law.

Two factors must be known in order to operate the calculator, and these are the percentage of butterfat in the cream or churning and the total weight of the churning. When these two factors are known, the number of pounds of butterfat in the churning may be quickly computed by manipulation of the calculator, as shown and described with reference to Figure 9, after which the amounts of the various constituents of the overrun to be added to the churning to produce a uniform composition may be quickly determined (once the percentages to be added have been ascertained by the tests heretofore mentioned) by simply shifting the hair line of the slide from the position shown in Figure 9, wherein the hair line is positioned on 4200 on scale A of the chart, to the position shown in Figure 10. In this latter position, the hair line is shown positioned in registration with 1260 on scale A, representing the pounds of butterfat contained in the churning. The slide 50 remains in the position shown in Figure 10, when determining the amounts of salt and moisture required, as it is only necessary to rotate the vernier 54 to bring the salt and moisture scales C and D thereof into operative relation to the hair line 53, to determine the amounts of these two constituents.

In the present application, we have shown the overrun as comprising the usual salt, moisture, coloring agent and curd. In some instances, it may be desired to add other ingredients to vary the composition of the butter to meet market requirements. The required concentrations of such other ingredients may readily be determined by the novel calculator herein disclosed, as will readily be understood.

It will be apparent to those skilled in the art that we have accomplished at least the principal objects of our invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim as our invention:

1. The method of determining the weight of a churning of butterfat and buttermilk in a given churn, which comprises, churning the cream to the point where the emulsion is broken and the butter fat globules have coalesced to the desired granular size, stopping the churning operation and prior to draining the buttermilk from the churn taking a liquid level reading of the buttermilk in the churn on a scale calibrated in weight units of the churning based on the volumetric capacity of the churn.

2. The method of producing uniformly controlled butter which comprises the following steps: churning a body of cream in a churn whose volumetric capacity is known, stopping the churning operation at the time the "break" occurs after the butterfat globules of the cream have coalesced to a desired granular size, then taking a liquid level reading of the buttermilk in the churn on a scale calibrated in weight units of the churning based on the volumetric capacity of said churn.

3. The method of producing uniformly controlled butter, including the following steps: determining the percentage butterfat content of an unknown volume of homogeneous cream, determining the weight of the churning by churning the cream to the point of "break" and then reading the liquid level of the buttermilk on a scale calibrated in weight units of the total churning based on the volumetric capacity of the churn, then from knowledge of the percentage butterfat content and the weight of the churning determining the weight of the butterfat in the churning.

4. The method of producing uniformly controlled butter, consisting of the following steps: determining the percentage butterfat content of an unknown volume of homogeneous cream, determining the weight of the churning by churning the cream to the point of "break" and then reading the liquid level of the buttermilk on a scale calibrated in weight units of the total churning based on the volumetric capacity of the churn, then from knowledge of the percentage butterfat content and the weight of the churning determining the weight of the butterfat in the churning, separating the butterfat from the buttermilk, determining the percentages of coloring matter, salt and moisture to be added to produce a uniform composition, then from said percentages and the weight of the butterfat determining the amounts of each to be added to the butterfat and thereafter thoroughly incorporating in the butterfat the determined amounts of coloring matter, salt and moisture.

JAMES K. CONNER.
EMERSON W. BIRD.
CHARLES B. FLAKKER.
OSCAR J. JOHNSON.